United States Patent [19]
Murakami

[11] Patent Number: 4,734,901
[45] Date of Patent: Mar. 29, 1988

[54] RECORDING AND REPRODUCING APPARATUS

[75] Inventor: Hiroyasu Murakami, Yokohama, Japan

[73] Assignee: Kabushiki Kaisha Toshiba, Kawasaki, Japan

[21] Appl. No.: 669,876

[22] Filed: Nov. 9, 1984

[30] Foreign Application Priority Data

Nov. 14, 1983 [JP] Japan .................................. 58-213515

[51] Int. Cl.⁴ ........................... G11B 7/00; G11B 5/09
[52] U.S. Cl. ........................................... 369/59; 360/48
[58] Field of Search ..................... 360/48, 49; 369/59

[56] References Cited

U.S. PATENT DOCUMENTS

| | | | |
|---|---|---|---|
| 4,072,987 | 10/1978 | Walker | 360/48 |
| 4,321,632 | 3/1982 | Leis et al. | 360/49 |
| 4,345,280 | 3/1982 | Blagaila et al. | 360/49 |
| 4,380,029 | 3/1983 | Bode | 360/48 |
| 4,422,111 | 4/1983 | Moeller et al. | 360/72.1 |
| 4,512,006 | 4/1985 | Murailami et al. | 369/59 |

FOREIGN PATENT DOCUMENTS

0079669  5/1983  European Pat. Off. .

*Primary Examiner*—Vincent P. Canney
*Attorney, Agent, or Firm*—Cushman, Darby & Cushman

[57] ABSTRACT

Tracks on a recording medium are divided into blocks each consisting of a block header area and a data area, and a block-synchronous code is added to the block header area while a frame-synchronous code is added to each frame at the data area.

15 Claims, 15 Drawing Figures

| MOTOR SPEED | SECTOR NUMBER | START SECTOR | BLOCK NUMBER OF START |
|---|---|---|---|
| 1 | 40 | 00 | 0 0 0 0 0 0 |
| 2 | 39 | 15 | 0 0 2 4 5 9 |
| 3 | 38 | 40 | 0 0 5 2 1 0 |
| ⋮ | ⋮ | ⋮ | ⋮ |

RECORDING AND REPRODUCING APPARATUS

BACKGROUND OF THE INVENTION

The present invention relates to a recording and reproducing apparatus for use in an optical disk apparatus or the like.

Optical disks are being used as image recording devices for image information filing. Image information in the form of documents is photoelectrically converted by two-dimensional light scanning, and the image information thus converted is recorded by an image recording device or retrieved and reproduced as hard or soft copies as the occasion demands.

With this kind of optical disk apparatus, the optical disk conventionally has data recorded in a spiral track or in concentric circular tracks, and data is recorded on or reproduced from the optical disk by means of an optical head which is moved linearly in the radial direction of the optical disk by the linear motor.

The spiral or concentric circular tracks on the optical disk are sectioned for each unit of data which has a certain length, such as a block, and a block address data which is previously recorded at the foremost end of the block.

The data on the disc is digital-coded, and that data which corresponds to one block is recorded continuously starting from the block data address. When data which is only a previously determined code is recorded continuously from the block address, however, discrimination of the block address data becomes difficult and thus provides a problem of recording and reproducing the data accurately.

In order to solve this problem, the rotary encoder, servo-disk and the like which rotate together with the optical disk are molded as the means for discriminating the header of the data on the optical disk. Even when these means are employed, however, sufficient accuracy is difficult to obtain when data is recorded at high density.

SUMMARY OF THE INVENTION

The object of the present invention is therefore to provide a recording and reproducing apparatus wherein recording and reproducing of data can be accurately achieved by dividing block data, which is to be recorded and reproduced for a certain length on a spiral track, into a block header and an encoding data. A block-synchronous code is added to the block header while a frame-synchronous code, which has different contents from the block-synchronous code, is added to the encoding data, and each of these synchronous codes is used as a re-synchronous code.

According to the present invention, a recording and reproducing apparatus capable of reliably discriminating the block and encoding data and accurately recording and reproducing data is provided.

According to the present invention, a recording and reproducing apparatus capable of reliably achieving re-synchronous operation by discriminating one optical block-synchronous code can be provided because the block-synchronous code which represents each block of data is recorded together with information which denotes the position of the block-synchronous code.

The present invention provides a recording and reproducing apparatus wherein a block-synchronous code is added to the block header of a block data which has a certain length, while a frame-synchronous code which has different contents from the block-synchronous code is added to an encoding data.

DETAILED DESCRIPTION OF THE PREFERRED EMBODIMENT

An embodiment of the present invention will be described with reference to the accompanying drawings.

Figure 1:
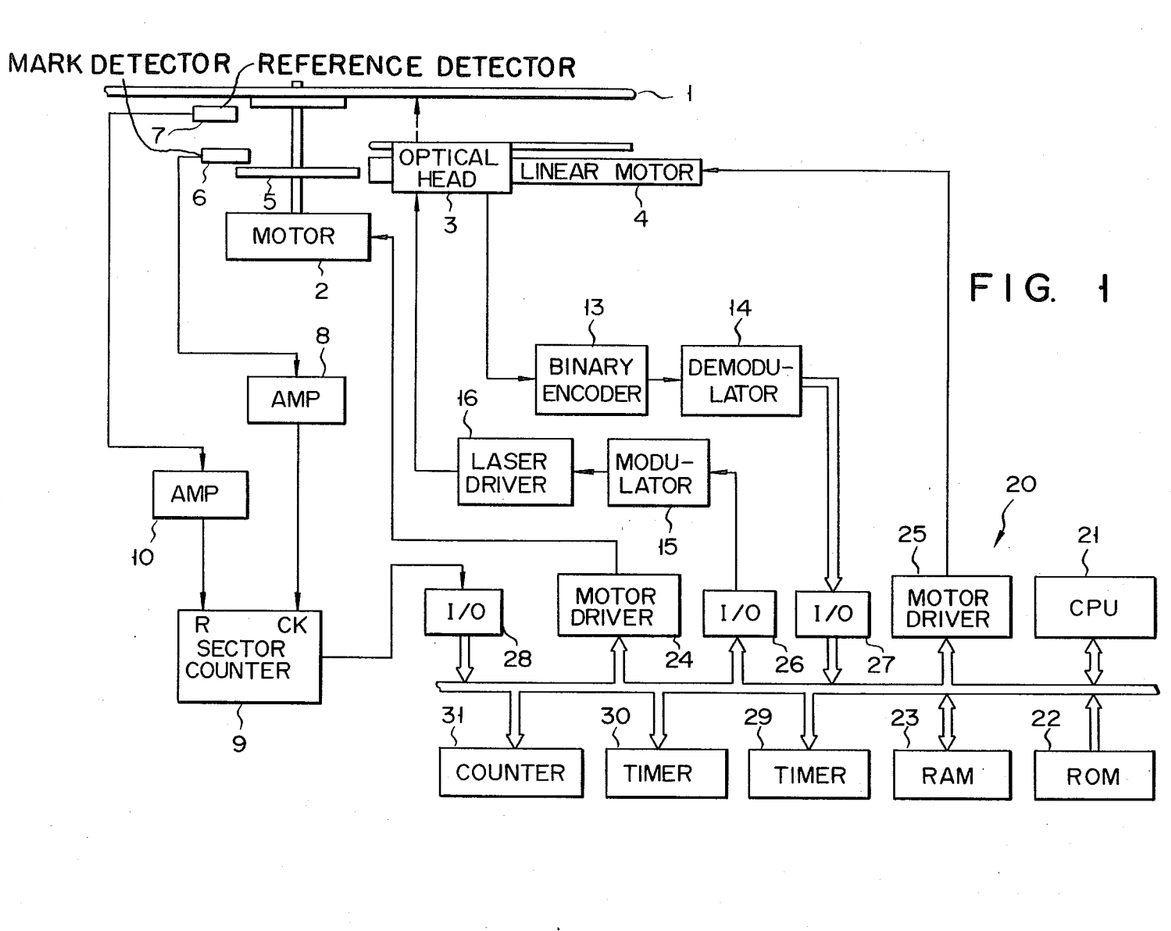
FIG. 1 is a block diagram showing an example of the optical disk apparatus according to the present invention.
Figure 2:
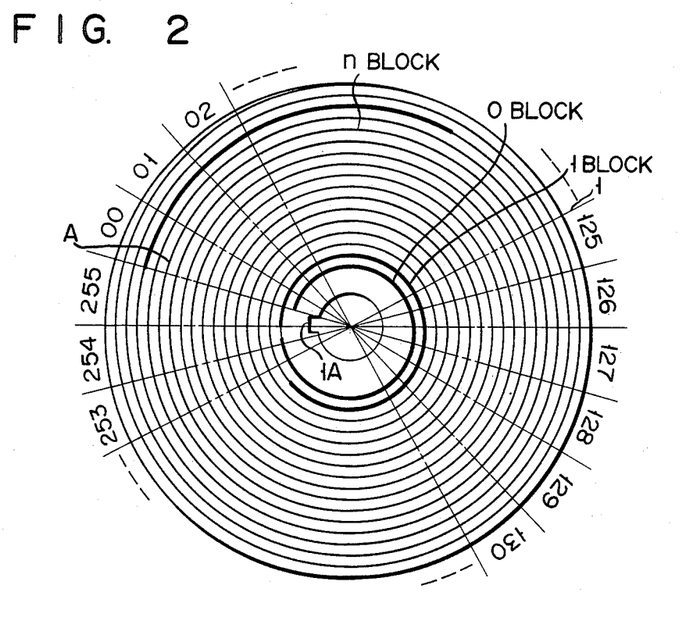
FIGS. 2 and 3 are plan views showing an optical disk.

In FIG. 1, an optical disk 1 is rotated by a motor 2. As shown in FIG. 2, the optical disk 1 is a circular plate made of glass, plastic or the like and coated on the surface thereof with a metal film such as tellurium and bismuth, leaving the center portion thereof uncoated. A cut-off 1A is provided adjacent to the center of the optical disk 1 and it is used as a mark which represents the reference position of the optical disk 1. A continuous spiral track is formed on the metal film.

This track is divided, at certain central angles relative to the reference mark, into 256 sectors including 0–255, for example, to manage the position of data at the time of the recording and the reproducing processes.

Information is recorded, as block data of a certain length, on the optical disk 1, each block data being recorded on the track for a certain physical length. Information can be recorded as 300,000 blocks in 36,000 tracks on the optical disk 1, for exampe. One block of information is recorded, using 40 sectors at the innermost part of the optical disk 1 and 20 sectors at the outermost part thereof. In the case where each of the blocks is not finished at the boundary of the sectors, the remaining portion of the sector at which the block is recorded is used as a block gap and the next block is started from the position at which the sector changes to a subsequent sector.

A block header including a block number, track number and the like is recorded at the start position of each of the blocks when the optical disk is produced, for example.

Figure 3:
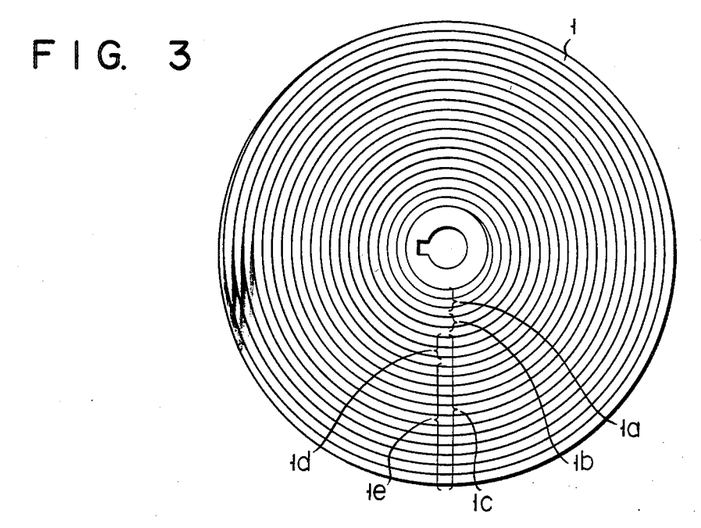

As shown in FIG. 3, the optical disk 1 includes a non-recording track area 1a, area 1b non-accessible by the user, and area 1c accessible by the user when viewed from the innermost circumference of the optical disk 1.

The non-recording track area 1a comprises 10 tracks located at the innermost circumference of the optical disk 1, and it is used as an allowance area for detecting and eccentrically correcting the tracks located at the innermost circumference of the optical disk 1.

The user non-accessible area 1b comprises those 200 (hexa-) blocks which correspond to an access error for allowing an optical head 12, which will be described later, to gain access, for example. Only the block header is recorded at each of the blocks located in this user non-accessible area 1b.

The user accessible area 1c comprises a defective block management information recording area 1d and a data block recording area 1e.

The defective block management information recording area 1d is intended to record defective block management information which comprises the start address of defective blocks and numbers of defective blocks. The defective block management information is recorded as shown in Table 1, for example.

TABLE 1

| Defective block address | Number of defective blocks |
|---|---|
| Defective block address | Number of defective blocks |
| . | . |
| . | . |
| . | . |
| Defective block address | Number of defective blocks |

In FIG. 1, the motor 2 is a Hall motor, for example, and its rotation speed is controlled by an operation control section 20. The operation control section 20 is a micro-computer comprising a CPU 21, ROM 22 in which programs are stored, RAM 23 and the like which are connected to one another by buses. Motor drivers 24, 25, I/O ports 26, 27, 28 timers 29, 30, counter 31 and the like are arranged at the operation control section 20. The rotation speed of the motor 2 is controlled by the output of the motor driver 24.

An optical head 3 for recording and reproducing information is located under the optical disk 1. This optical head 3 is of a well-known type comprising a semiconductor laser oscillator, collimating lens, beam splitter, λ/4 wavelength plate, objective lens, light receiver, and the like, for example. The optical head 3 is held by a linear motor 4, which is controlled by the motor driver 25, to move in the radial direction of the optical disk 1.

The output of the I/O port 26 is applied to a laser driver 16 through a modulator 15 and the laser oscillator in the optical head 3 is driven by the output of the laser driver 16. The output of the optical head 3 is applied, for demodulation, to a demodulator 14 through a binary encoder 13 and then inputted to the I/O port 27.

Figure 4:
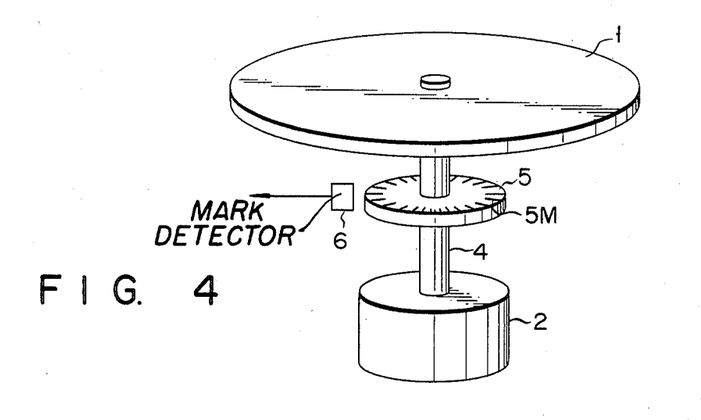
FIG. 4 shows the relation between the optical disk and a detector.

As shown in FIG. 4, a disk 5 on which signal generating marks 5M spaced a certain distance apart are drawn, is attached to a shaft 4 of the motor 2. The marks 5M on the disk 5 are optically detected by a mark detector 6 which comprises a light-emitting diode and light receiving element. A reference detector 7, which optically detects the reference position mark 1A of the optical disk 1, and which comprises a light-emitting diode and light receiving element, is arranged under the disk 1. The output of the mark detector 6 is applied to a clock input terminal of a sector counter 9 through an amplifier section 8. The output of the reference detector 7 is applied to a reset input terminal of the sector counter 9 through an amplifier section 10. The output of the sector counter 9 is also inputted to the I/O port 28.

Figure 5:
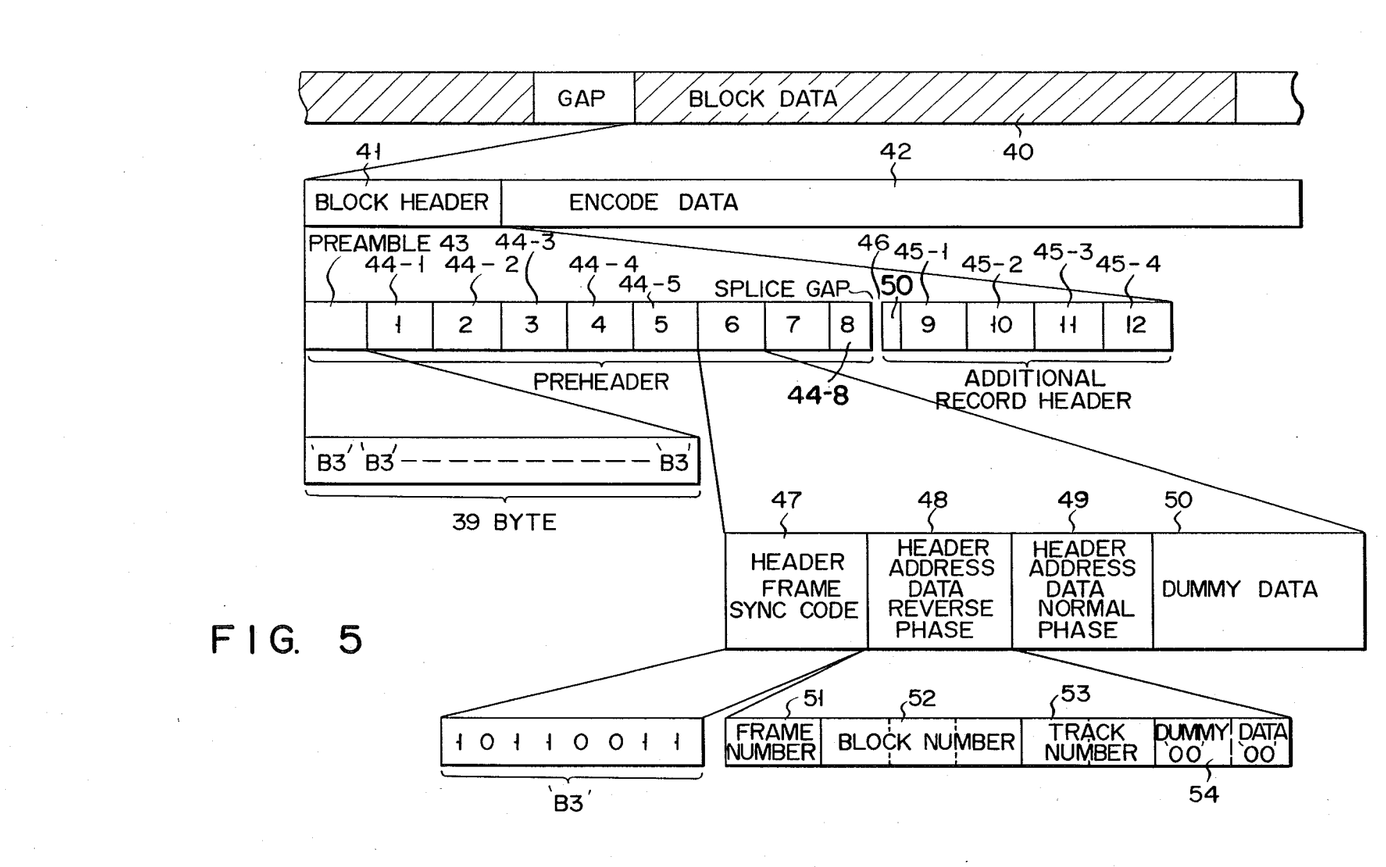
FIGS. 5 through 7 show a recording format on the optical disk.

A recording format on the optical disk 1 will be described referring to FIGS. 5 through 7. A block of data 40, which is recorded at each of the blocks along the track groove on the optical disk 1, comprises a block header area (detailed in FIG. 5) and a data area (detailed in FIG. 6). A block header 41 is recorded at the block header area while the encoding data 42 is recorded at the data area.

The block header 41 comprises a preamble data 43 which is represented by 39 bytes of the hex code 'B3' preheaders 44-1–44-8 including 8 frames, and an additional recording header including 4 frames. A frame 46 having a splicer gap which is caused by a shift in recording time, is provided between the preheader and the additional recording header.

The preheadders 44-1–44-8 are previously written, before the user records any data on the optical disk 1. The additional recording headers 45-1–45-4 are recorded at the time of recording data on the block concerned, after the preheaders 44-1–44-8 but prior to the encoded data 42.

Each of the frames which correspond to the preheaders 44-1–44-8 comprises 39 bytes including a header frame-synchronous code (or block synchronous code) 47 or one byte, header address data 48 and 49 each having positive and negative polarities of 8 bytes, and a dummy data 50 represented by "B3" of 22 bytes.

The header address data 48 and 49 comprise a frame number 51 in the header of one byte, block number 52 of 3 bytes, track number 53 of 2 bytes and "00" of 2 bytes which serve as dummy data. The frame number 51 in the header is a number for discriminating 12 frames in the same block header 41, these 12 frames in the header 41 being numbered in order from 1 to 12 in the form of 8 preheaders 44-1–44-8 and 4 additional recording headers 45-1–45-4. Further, in the case of the header address data 48 and 49, the contents of the negative polarity address are reversed in polarity from the contents of the positive polarity address, so that one contents are recorded as "0101" when the other contents are "1010", for example.

The header frame synchronous code 47 is 2-7 converted before recording Therefore, data of "B3", for example, is subjected to 2-7 conversion according to Table 2. However, a part of the coded date "0100100000001000" thus modulated is corrected to "0100100000000100" (in which the contents of the thirteenth and fourteenth bits (counting MS→LSB) are exchanged with each other and 8 "0"s are in a row).

TABLE 2

| Data | | Code |
|---|---|---|
| Hexadecimal | Binary | Binary |
| F | 11** | 1000**** |
| B | 10** | 0100**** |
| 5 | 011* | 001000** |
| 4 | 010* | 100100** |
| 0 | 000* | 000100** |
| 3 | 0011 | 00001000 |
| 2 | 0010 | 00100100 |

This table shows the standard 2,7 conversion.

This coded data is demodulated as "B3" at the time of demodulation.

Figure 7:
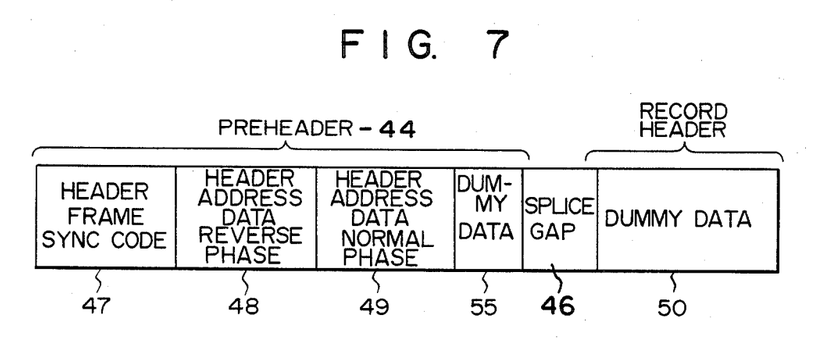

As shown in FIG. 7, the frame at which the splicer gap 46 is caused comprises a header frame synchronous code 47 of one byte on the side of the preheader 44, header address data 48 and 49 each having positive and negative polarities of 8 bytes, dummy data 55 of 2 bytes, thus causing preheader 8 to have only 19 bytes. Splicer gap 46 of 2 bytes is used for connection at the time of recording, and dummy data 50 of 18 bytes is used on the side of the additional recording header 45. Therefore (preheader 44-8)+(splicer gap 46)+(dummy data 50)=39 bytes.

Figure 6:
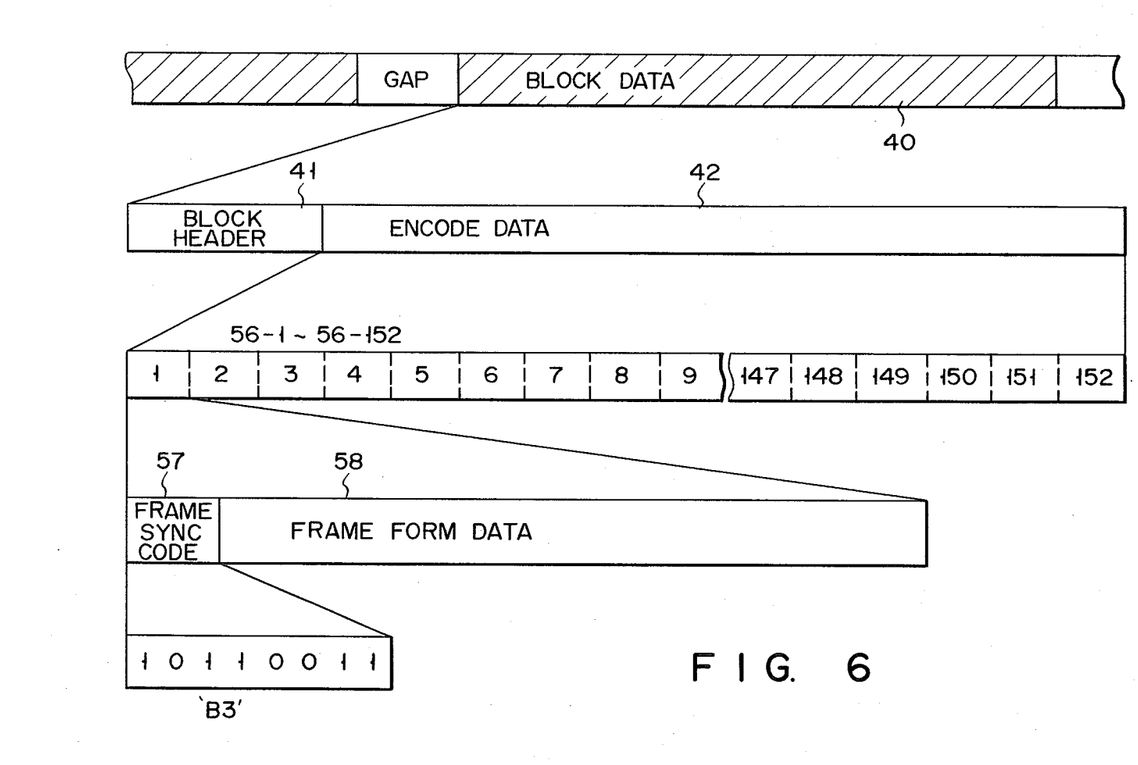

On the other hand, the data area at which the encode data 42 is recorded consists of 152 data frames 56-1-56-152 as shown in FIG. 6. Each of the data frames records recording data as a coded data which is obtained by modulating the recording data according to the 2-7 code conversion, and consists of a frame synchronous code 57 of 1 byte and a frame form data 58 of 38 bytes. The frame synchronous code 57 records a coded data "0100100000001000" which is obtained by modulating the data "B3", for example, by a 2-7 code conversion.

The frame synchronous code 57 is intended for re-synchronization of code breaking position, at which one code data (e.g., frame form data n) is separated from adjoining code data (frame sync code n+1) and data frame at the time of code decoding. An ECC code (or error correction code) is added to each of the data frames 56.

Figure 8:
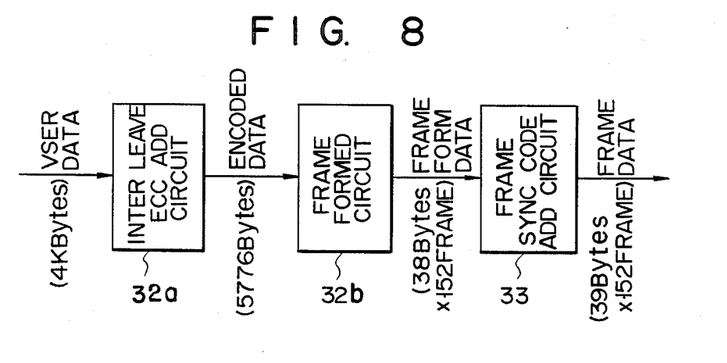
FIG. 8 is a block diagram showing a modulator.

The modulator 15 (shown in FIG. 1) interleaves a block data of a certain length, which is outputted from the I/O port 26 and which has 4K bytes, and adds an ECC code to it by an interleaving and ECC adding circuit 32a generate an encoded data of 5776 bytes, which is formed as a frame data every 38-bytes by means of a frame forming circuit 32b. A frame synchronous code is added to this frame data by a frame synchronous code adding circuit 33. In this way, 152 frame data, each having 39 bytes are outputted.

The modulated code of the frame synchronous code 57 has a pattern of seven continuous bits of "0" value. It is apparent from Table 2 that this pattern having seven continuous "0" fits is caused when one byte data is of any of "F3", "33" and "B3". The end part of the code which has seven continuous "0"s never fails to become "—100000001000", and the boundary at which the code is demodulated to data can be discriminated by detecting the seven continuous "0"s pattern. Namely, the breaking point of reading codes can be re-synchronized by detecting seven continuous "0"s.

In the case of 2-7 code conversion of the recording data, the pattern having seven cntinuous "0"s is sometimes generated twice successively when "33" is used as the frame synchronous code to code bit rows of variable length consisting of 2, 3 and 4 bits. When detection of the synchronous code depends upon the pattern of seven continuous "0"s, therefore, it may happen that detection of the synchronous code is finished before the end of one byte synchronous code.

When "F3" is used as the frame synchronous code, it may also happen that seven continuous "0"s cannot be detected because of a bit shift caused at the time of demodulation.

When "B3" is used as the frame synchronous code, however, the breaking point of code reading can be reliably re-synchronized. In addition, frame resynchronization can be reliably achieved due to the frame synchronous code even when a bit shift is caused at the time of code reading.

In the case of the 2-7 code conversion shown in Table 2, therefore, "B3" is the best choice for the frame synchronous code of 1 byte.

Figure 9:
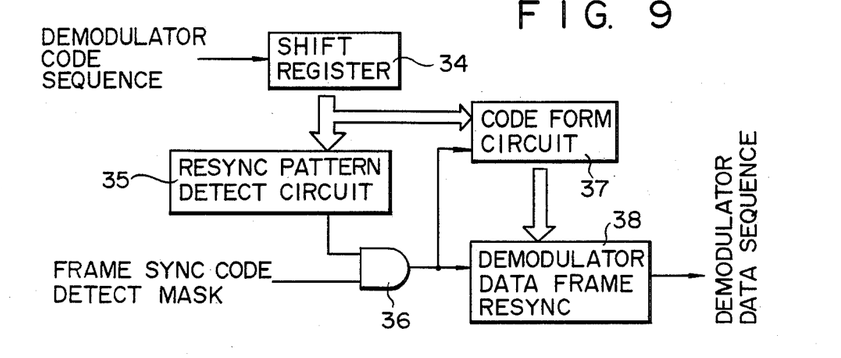
FIG. 9 is a block diagram showing a demodulator.

A demodulator circuit 14 demodulates data in such a way that a signal applied from a binary encoder 13 is converted in reverse of the 2-7 conversion code. As shown in FIG. 9, for example, the demodulator circuit 14 comprises a shift register 34 for storing reproduced signals, a re-synchronization pattern detecting circuit 35 for detecting the re-sychronization pattern responsive to the output of the shift register 34, an AND circuit 36 for use between the output or the resynchronization pattern detecting circuit 35 and a frame synchronous code detecting mask, a code forming circuit 37 for forming the output of the shift register 34 in response to the output of the AND circuit 36, and a data demodulating and frame re-synchronizing circuit 38 for demodulating the output of the code forming circuit 37 in response to the output of the AND circuit 36 and in reverse to the 2-7 conversion code.

Figure 10:
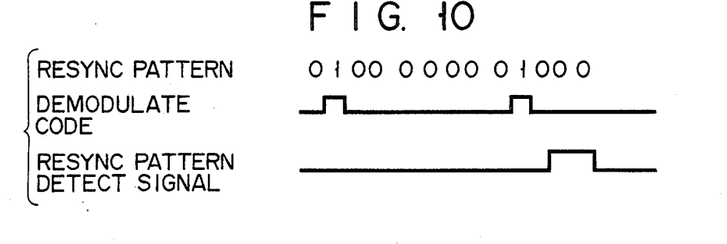
FIG. 10 shows a re-synchronous pattern detecting signal.
Figure 11:
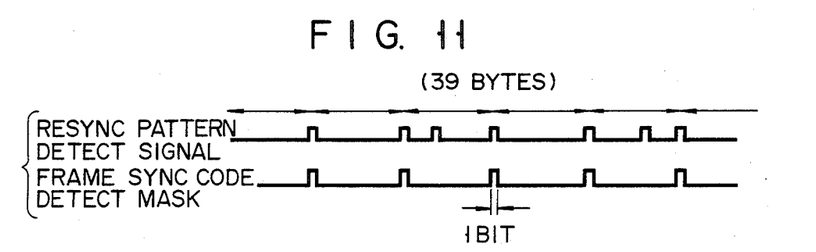
FIGS. 11 and 12 show the relation between a synchronous code position detecting signal and a frame-synchronous code detecting mask.
Figure 12:
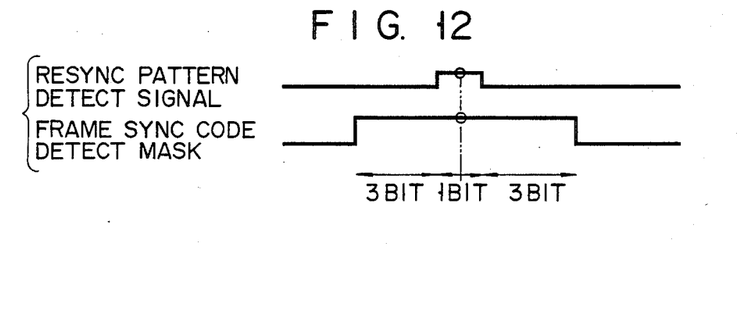

When a resynchronization pattern having seven continuous "0"s is detected from the demodulated code by means of ré-synchronous pattern detecting circuit 35, as shown in FIG. 10, a re-synchronous pattern detection signal is generated. As shown in FIG. 11, AND circuit 36 performs an AND operation between the re-synchronous pattern detection signal and the frame synchronous code detecting mask which is caused after a certain time period from the frame synchronous code position detecting timing of previous frame. The breaking point of code reading is re-synchronized at a timing at which this AND operation is performed. The frame synchronous code detecting mask usually has one bit. However, when frame synchronization re-form data is difficult, a width of 3 bits is provided at the front and back of a bit position at which the re-synchronization pattern detection signal is naturally generated, as shown in FIG. 12. When the frame synchronization detecting mask is provided with this width, any bit shift which is caused within three bits at the front and back of the bit position can be corrected, even if demodulation which requires a long time to finish is carried out. Namely, the resynchronization pattern detection is performed at a timing which represents the breaking point of bytes of one code and of the next code of the frame synchronous signal, and this pattern is not included in three bits at the front and back of the bit position except the formal re-synchronous pattern, even when the frame synchronous code is between its previous and subsequent data and coded. Even when any shift in the breaking position of code reading is caused at the time of data demodulation or any shift is caused within ±3 bits of demodulated data, frame synchronization can be carried out by adding the frame synchronous code to each of the frame data.

Figure 13:
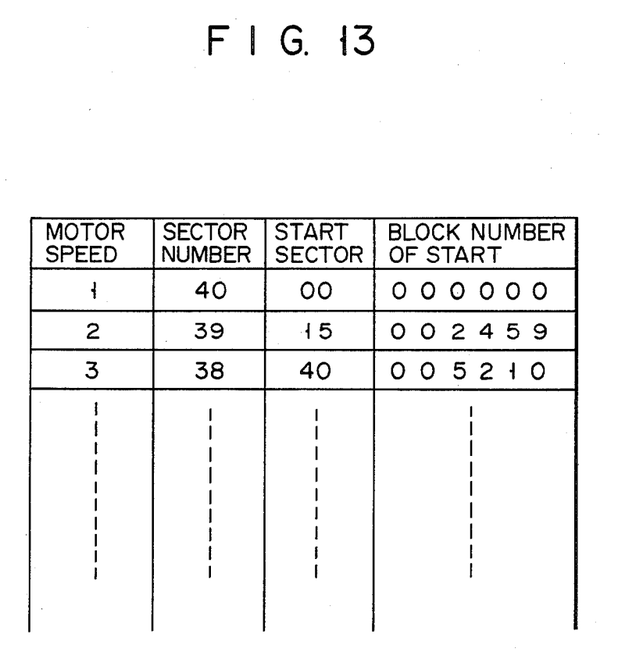
FIG. 13 shows an example of memorizing conversion data.

The operation control section 20 controls the whole of the device in response to a signal applied from an external control device or host computer (not shown), for example. When a block number is applied to the operation control section 20 for recording or reproduction, for example, track and start sector numbers to which access is obtained in response to conversion tables stored in memories, such as ROM 22 and RAM 23, are calculated to obtain speed information. As shown in FIG. 13, for example, the memories store conversion tables in which the speed information of the optical disk 1 in every 256-tracks, number of sectors of one block at a given track speed, first block number in 256 tracks at this given speed and start sector of the block.

When a block number "10", for example, is applied from the external apparatus to the operation control section 20, the number of sectors of this one block is obtained from tables as being "40", and is stored in the memories. When the block number is between 0 and 255, the block number of the first block in the tracks is "0", and the start sector is "00", the numbers of tracks and sectors of the block number "10" are calculated accordingly. A quotient which is obtained from a formula "[block number intended−first block number)-×number of sectors+start sector]÷256+track number of first block" represents the track number while its remainder represents the number of sectors. Therefore the track number and the start sector can be calculated as "1" and "144", respectively.

The operation control section 20 controls the motor driver 24 in response to the speed information obtained at the time of access, thereby controlling the rotation speed of the motor 2 in such a way that the accessed track on the optical disk 1 has a certain linear speed relative to the optical head 3. The operation control section 20 converts the track number to a scale value at the time of calculating the track number, and the linear motor 4 is controlled by the motor driver 25 until this scale value coincides with a position detected in response to the output of a position detector (not shown). The optical head 3 is moved to irradiate a predetermined track with its beam light. The operation control section 20 starts the recording and reproducing operations of the optical head 3 when the optical head 3 is positioned relative to an intended track at the time of access and when the start sector coincides with a value counted by the sector counter 9.

Using the modulator 15, the operation control section 20 modulates recording data applied from the host computer through an I/O port (not shown), and applies it to the laser driver 16. This laser driver 16 drives a semiconductor laser (not shown) of the optical head 3 in response to the modulated signal applied, thereby recording information.

The operation control section 20 detects header frames, using timers 29 and 30, to detect defective blocks, and causes the detected result to be stored in the memories, such as RAM 23, and also causes this result to be recorded at the defective block management information recording area 1d on the optical disk 1 when the detection of defective blocks is finished. The operation control section 20 causes the counter 31 to count the number of header frames detected every block. The timer 29 is made operative during a time period which corresponds to the reproducing time starting from a block header and ending in one at its subsequent block. The timer 30 defines the time of reading the block header at every block.

The optical disk 1 is mounted on the optical disk apparatus at the time of preparing the optical disk 1. Block numbers are supplied from the host computer (not shown) to the operation control section 20 to record block headers. The operation control section 20 calculates the track number of an intended block, start sector and speed information, using the conversion tables stored in the memories. Namely, the operation control section 20 judges the scope and speed information of the track in which an intended block number in the conversion tables is included, and carries out an operation of "[(intended block number−first block number)×sector number+start sector]÷256+track number of first block" according to the scope data of the track. The track number and start sector of the intended block are calculated from the result of this operation. The operation control section 20 controls the motor driver according to the speed information. The motor driver 24 controls the motor 2 to rotate the optical disk 1 at a rotation speed which corresponds to that of the track. The operation control section 20 converts the track number to a scale value and causes the motor driver 25 to drive the linear motor 4 to move the optical head 3 until the scale value coincides with a position detected in response to the output of the position detector (not shown). Then, the operation control section 20 drives the laser driver 16 to serve as a preheader for recording preamble data and eight header frames, when a value counted by the counter 9 coincides with the start sector. Thereafter, preheaders relating to other blocks are recorded on the optical disk 1 as described above. Preheaders are recorded like this for 300,000 blocks on the whole surface of the optical disk 1.

The optical disks, which have been prepared in this way are then put on the market.

It is judged whether or not the preheader recorded at each of the blocks can be correctly reproduced, and any block provided with the preheader which cannot is regarded as a defective block. This judgement result is stored at the defective block management information recording area 1d on the optical disk 1. More specifically, the host computer (not shown) indicates the operation control section 20 to have access to the first block. The operation control section 20 therefore calculates the track, start sector and speed information of the first block, using the conversion tables in the memories. The operation control section 20 thus controls the motor driver 24 according to the speed information. The motor driver 24 drives the motor 2 accordingly to rotate the optical disk 1 at a rotational speed which corresponds to that of the track. The operation control section 20 converts the track number to a scale value and causes the linear motor 4 to drive the optical head 3 until the scale value coincides with a position detected in response to the output of the position detector (not shown). The operation control section 20 then causes the laser driver 16 to drive the optical head 3 to reproduce data on the optical disk 1, when the count by the sector counter 9 coincides with the start sector. It is detected whether or not the header frame at the preheader in the block header of the first block on the optical disk 1 can be read. More specifically, when reverse-phase header address data having eight bytes are compared bit by bit with those having a positive phase in an exclusive "or" operation and when every result of the exclusive "or" operation becomes "1", it is judged that the header frame has been read correctly, but when even one of the operation results becomes "0", it is judged that the header frame is not correct. In a case where the header frame at the first block is not detected even after a predetermined time period, the operation control section 20 regards the optical disk 1 as a defective product and informs the operator about it.

When the header frame is correctly read when the header frame at the first block is detected, the operation control section 20 renders the timers 29 and 30 operative. The operation control section 20 then causes the header counter 31 to count up, and to further count up when other header frames are successively and correctly read from signals reproduced from the optical disk 1. When the timer 29 finishes its operation and the contents counted by the header counter 31 are lower than "4", the operation control section 20 judges the first block as defective and causes the memories to store its number. When the contents of the header counter 31 are higher than "5", the operation control section 20 judges the first block as correct and accesses a second block. The operation control section 20 controls the motor driver 24 according to speed information relating to the second block so as to rotate the optical disk 1 at a speed which corresponds to the speed information. The operation control section 20 also converts the track number of a third block to a scale value and causes the motor driver 25 to drive the optical head 3 until the scale value coincides with a position detected in response to the output of the position detector (not shown). The operation control section 20 now checks that the timer 29 has finished its operation.

In a case where the header frame at the second block is not detected even though the time set in the timer 29 has elapsed, the second block is judged as defective and its number is stored in the memories. The operation control section 20 then accesses the third block and controls the motor driver 24 according to the speed information of the third block rotating the optical disk 1 at a speed which corresponds to the speed information. The operation control section 20 also converts the track number of the third block to a scale value and causes the motor driver 25 to drive the optical head 3 until the scale value coincides with a position detected responsive to the output of the position detector (not shown). The operation control section 20 then renders the timer 29 operative and now checks that the timer 29 has finished its operation.

Thereafter, detection of the header frame is carried out for every block, as described above, and when this detection is finished for the last block, the operation control section 20 judges the recording of the defective blocks and causes the motor driver 25 to drive the optical head 3 to the defective block recording area 1e. The operation control section 20 then reads defective block data stored in the memories and calculates addresses of the defective blocks and the unit number of the continuous defective blocks according to the data. The operation control section 20 drives the laser driver 16 according to the calculated data, to thereby record the data. Such addresses and unit number of the defective blocks as shown in Table 1 are thus recorded at the defective block management information recording area 1d on the optical disk 1.

Figure 14:
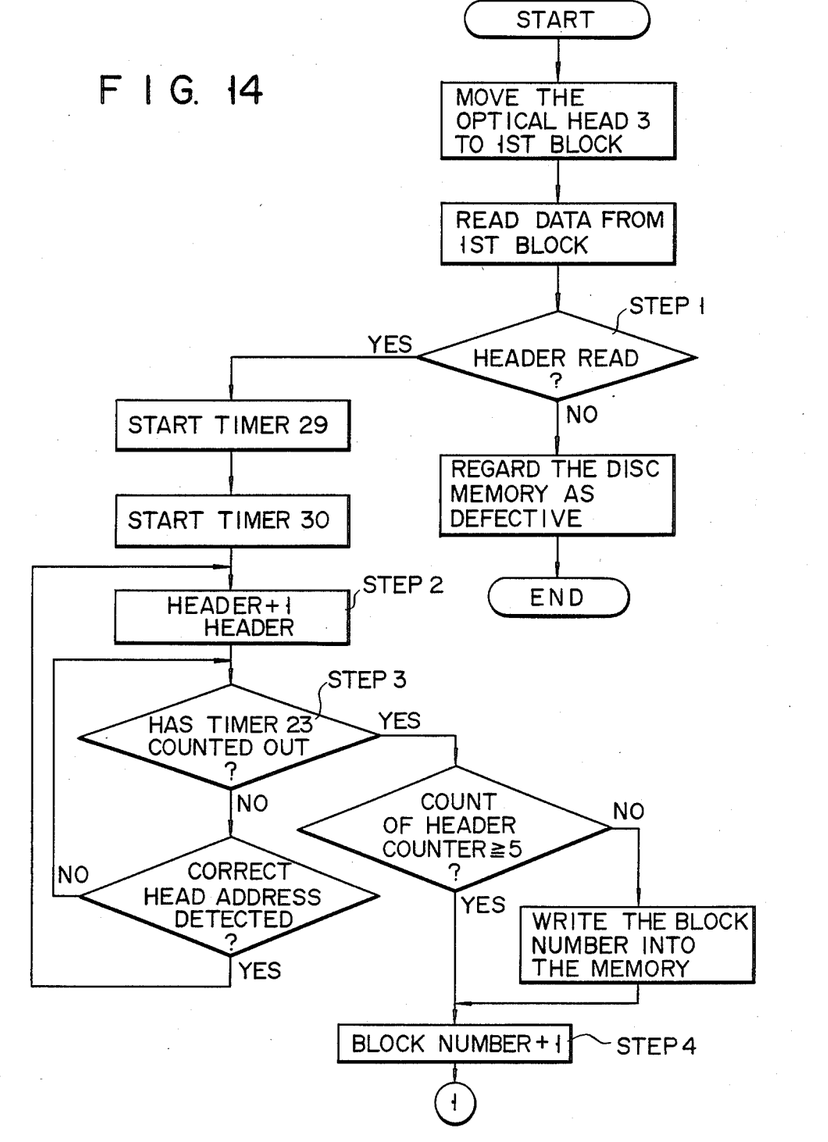
FIGS. 14 and 15 are flowcharts to describe the memory of defective blocks.
Figure 15:
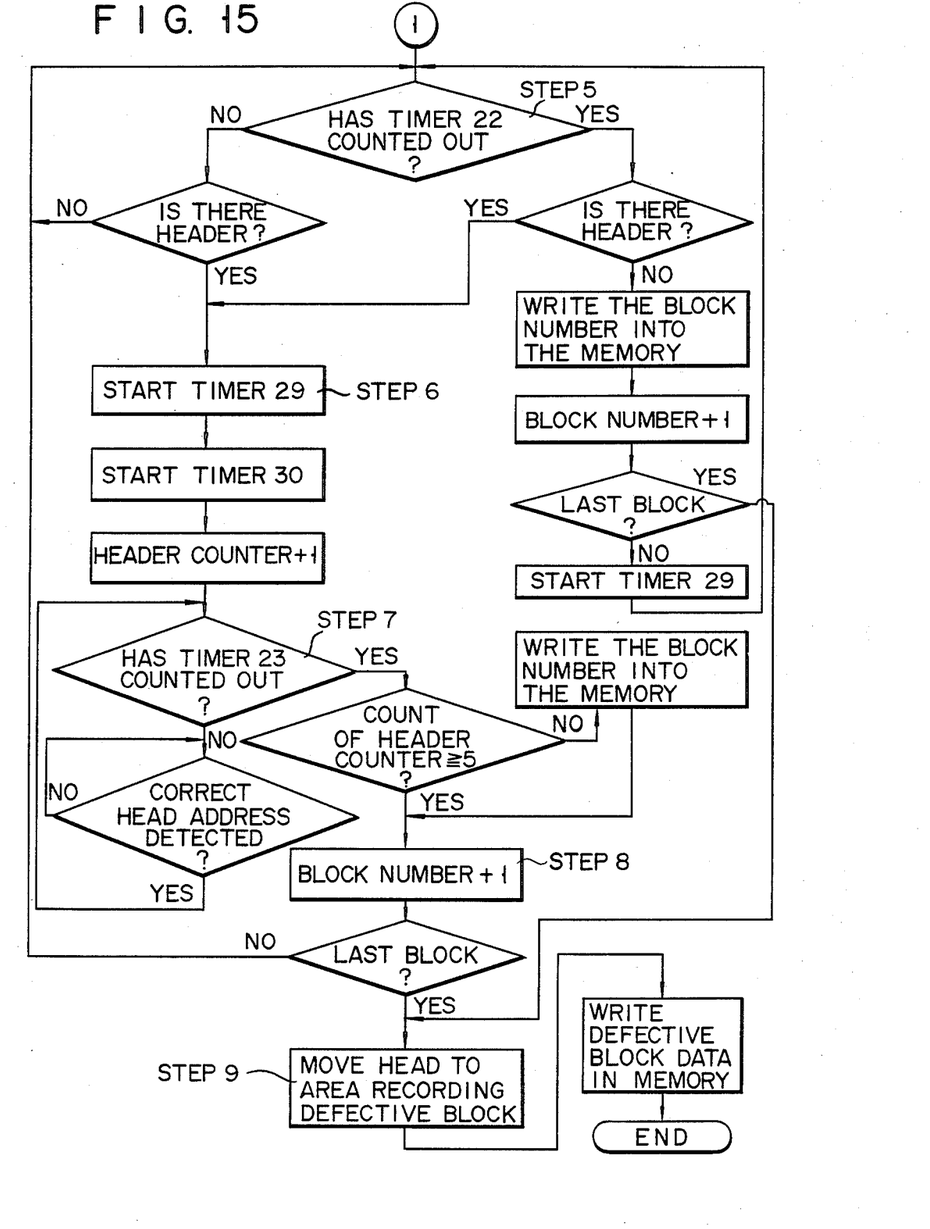

FIGS. 14 and 15 are flow charts which describe the memory of the defective blocks. At the start, the optical head 3 is moved to the first block and data is read from the first block. It is judged at step 1 whether or not the header can be read. When the result is no, the disk memory is regarded as defective and the process is ended. When the result at step 1 is yes, timers 29 and 30 are started and 1 is added to the header at step 2. It is judged at step 3 whether or not the timer 23 has counted out. When this result is no, it is then judged whether or not correct head address is detected. When the result is yes, the process returns to step 2, while when no, it returns to step 3. When the result at step 3 is yes, the count of the header counter 25 is judged. When the result is yes, 1 is added to the block number at step 4. When the result is no, the block number is written into the memory and step 4 is then carried out.

Referring to FIG. 15 at step 5 it is determined whether or not the timer 22 has counted out. When the result is no, it is judged whether or not any header is present. When the result is yes, the timer 29 is started at step 6 and the timer is then started, and 1 is added to the header counter. It is judged at step 7 whether or not the timer 23 has counted out. When the result is no, it is judged whether or not the correct head address is detected. When the result is no, the same process is repeated again, while when the result is yes, the process returns to step 7. When the result at step 7 is yes, the count of the header counter 25 is judged. When the result is yes, 1 is added to the block number at step 8. When the result is no, the block number is written into the memory and step 8 is then carried out. The last block is judged and when the result is no, the process returns to step 5, while when yes, the head is moved to the defective block recording area at step 9 and defective block data is written in the memory. The process is thus ended.

When the judgment at step 5 is yes, it is judged whether or not any header is present. When the result is yes, step 6 is carried out, while when no, the block number is written into the memory. 1 is added to the block number and the last block is judged. When the result is yes, step 9 is carried out, while when no, the timer 29 is started and the process is then returned to step 5.

When the user sets the optical disk on the image information recording and retrieving device (not shown), therefore, defective block data at the defective block management information recording area 1d on the optical disk 1 is stored in the control floppy disk (not shown). If the defective block data is recorded at the time of recording data on the optical disk 1, the data can be prevented from being recorded at the defective blocks.

The recording of data will be described. The optical disk 1 is set on the optical disk apparatus. Recording data and address data (or block number) are supplied from the host computer (not shown) to the operation control section 20. Using the conversion table stored in the memory, the operation control section 20 calculates the track, start sector and speed information of an intended block. More specifically, the operation control section 20 judges the scope of the track in which the intended block number in the conversion table is included, as well as the speed information, and it makes an operation "[(intended block number−first block number)×sector number+start sector]÷256+track number of the first block" to calculate the track number and start sector of the intended block from this operation result. The operation control section 20 thus controls the motor driver 24 according to the speed information. The motor 2 is thus driven to rotate the optical disk 1 at a speed which corresponds to the track. The operation control section 20 also converts the track number to a scale value and causes the motor driver 25 to drive the optical head 3 until the scale value coincides with a position detected in response to the output of the position detector (not shown). When the value counted by the sector counter 9 coincides with the start sector, the operation control section 20 drives the laser driver 16 to record 4 header frames, as additional recording headers (or additional recording address data), following 2-byte splicer gap and then record 152 data frames, as recording data, following the recorded header frames. Namely, when the 8th frame of the preheader becomes the 19th byte, 18-byte dummy data ("00") is recorded after 2 bytes (or splicer gap) when counter from the last of the preheader. 152 data frames each consisting of a 1-byte frame-synchronous code and 38-byte length-fixed data are recorded. Namely, the operation control section 20 adds interleaving and ECC to the 4K-byte recording data through the interleaving and ECC adding circuit 31 and converts it to 5776-byte encoded data, which is formed into frames each having 38 bytes by the frame forming circuit 32. A one-byte frame-synchronous code is added to this frame by means of the frame-synchronous code adding circuit 33, and frame data is outputted to the 152 frames every 39-byte. This output is supplied to the laser driver 16 via the modulator circuit 15. According to the data supplied, the laser driver 16 drives the semiconductor laser (not shown) in the optical head 3 to record, following the additional recording header on the optical disk 1.

Reproducing of data will be described. The optical disk 1 is set on the optical disk apparatus. A reproducing block number is supplied from the host computer (not shown) to the operation control section 20. The operation control section 20 calculates the track, start sector and speed information of an intended block, using the conversion table stored in the memory. More specifically, the operation control section 20 judges the scope of the track in which the intended block number in the conversion table is included, as well as the speed information, and it operates the formula "[(intended block number−first block number)×sector number+start sector]÷256+track number of first block" according to the scope data of the track to thereby calculate the track number and start sector of the intended block from this operation result. The operation control section 20 controls the motor driver 24 according to the speed information. The operation control section 20 drives the motor 2 to rotate the optical disk 1 at a speed which corresponds to the track. The operation control section 20 also converts the track number to a scale value and causes the motor driver 25 to drive the optical head 3 until the scale value coincides with a position detected in response to the output of the position detector (not shown). The operation control section 20 then drives the laser driver 16 to start reading the optical disk 1 when the value counted by the sector counter 9 coincides with the start sector. The signal thus read is encoded by the binary encoder 13 and supplied to the demodulator 14. The demodulator 14 converts the signal in reverse to 2-7 code conversion, and inputs it to the operation control section 20 via the I/O port 27. The operation control section 20 compares the 8-byte reverse-phase header address data, which is reproduced following the header frame-synchronous code, with the one of positive phase by an exclusive "or" operation. When every operation result is "1" and the frame number of the header frame is in "1"-"12", the operation control section 20 judges that the header frame has been correctly read. The header frame read may be single or plural in this case. The operation control section 20 checks whether or not the address data coincides with that of the block which is to be reproduced. When they coincide with each other, data which has been recorded following the block header of this header frame is reproduced.

The signal which has been read is encoded to a binary value by means of the binary encoder 13 and supplied to the demodulator circuit 14. The signal applied from the demodulator circuit 14 is supplied to the re-synchronization pattern detecting circuit 35 and code forming circuit 37 through the shift register 34. When "0"s which are continuous for over 7 bits are supplied, the re-synchronization pattern detecting circuit 35 outputs a re-synchronization pattern detection signal to the AND circuit 36. If a frame-synchronous code detection mask signal which is responsive to the synchronous timing of the header frame is supplied in the case of the first frame data, the AND circuit 43 is rendered operative. A timing signal is applied from the AND circuit 43 to the code forming circuit 44 and data demodulating and frame re-synchronizing circuit 38. The code forming circuit 37 forms a demodulation signal applied from the shift register 34, in response to a timing signal applied from the AND circuit 36 and the data demodulating and frame re-synchronizing circuit 38 also carries out the demodulation of data and re-synchronization of frames in response to the timing signal. One hundred and fifty two frames of data are successively demodulated and supplied to the operation control section 20.

In a case where no timing signal is outputted because the frame synchronization pattern detection signal does not coincide with the frame synchronization code detection mask, the frame synchronization code detection mask is expanded to cover 7 bits, as described above, and the above-described process is repeated again. Re-reading can be thus reliably achieved even when there has been a bit shift.

Data of other blocks can be similarly reproduced according to the above-described process.

Although the above description has been made relating to the optical disk which is used as the recording medium, it should be understood that the present invention is not limited to the optical disk but may be applied to magnetic tape, floppy disks and the like.

What is claimed is:

1. A recording medium for a recording and reproducing device in which recording and reproducing can be carried out using blocks on said recording medium which are formed by dividing tracks on the recording medium, said recording medium comprising:
   at least one information recording track, divided into a plurality of blocks;
   each of said blocks including at least a block header area and at least an encode data area;
   said block header area including (a) a plurality of preheader areas, each said preheader area storing address data indicative of each of said blocks of one of said at least one information recording track, and (b) a block-synchronous code data, said block-synchronous code data formed by code-converting a particular code to form a code-converted particular code, then partly modifying said code-converted particular code to form a modified code-converted particular code, said partly modifying occuring such that a predetermined number of continuous same bits are included in said modified code-converted particular code; and
   said encode data area includes a plurality of data frame areas, each said data frame area storing recording data and a data frame-synchronous code, said data frame-synchronous code including a code pattern which is substantially different from said modified code-converted synchronous code in a way such that said block-synchronous code and said frame-synchronous code can be distinguished.

2. A recording and reproducing medium according to claim 1, wherein said block-synchronous code comprises a pattern, said pattern not occurring in any combination of data.

3. A recording and reproducing medium according to claim 1, wherein said data area consists of a plurality of data frames and a frame-synchronous code is added to the front of each of said data frames.

4. A recording and reproducing medium according to claim 1, wherein a plurality of header frames comprise materially similar contents including a track number on said recording medium, a block number and said header frame-synchronous code, said track number, said block number and said header frame-synchronous code being recorded at said block header area.

5. A recording and reproducing medium according to claim 4, wherein a specific frame number representing a position of each of said header frames is added to each of said header frames.

6. A medium according to claim 1, wherein each said preheader area comprises substantially equal bit lengths and said block header area further includes a preamble area positioned at the front of said block header.

7. A medium according to claim 6, wherein one of said preheader areas includes a splice gap area for performing switching between recording and reproducing operations and dummy data.

8. A medium according to claim 7, wherein each of said block header areas further includes additional record headers at each end portion of said block header.

9. A medium according to claim 1 wherein said partly modifying is such that said modified code-converted particular code is different from any possible code-converted particular code.

10. A medium as in claim 1 wherein said code converting uses 2-7 coding, and said modified code-converted particular code is modified in a way such that it includes eight continuous zeros.

11. A medium as in claim 1 wherein said code converting uses a run-length coding scheme.

12. A recording and reproducing device in which recording and reproducing can be carried out using blocks on a recording medium, formed by dividing tracks on the recording medium and each of which includes a block header area and data area, said recording device comprising:

first means for reading from/writing to at least one information recording track, divided into a plurality of blocks, each of said blocks including at least a block header area and at least an encode data area;

second means, coupled to said first means, for accepting data from said block header area which includes a plurality of preheader areas, said second means receiving: (a) address data indicative of each of said blocks of said one information recording track from each said preheader area, and (b) a block-synchronous code data, said block-synchronous code data formed by code-converting a particular code to form a code-converted particular code, then partly modifying said code-converted particular code to form a modified code-converted particular code such that a predetermined number of continuous same bits are included in said modified code-converted particular code; and third means, coupled to said first means, for reading from/writing to said encode data area using said first means, said third means accessing a plurality of data frame areas, each said data frame area storing recording data and a data frame-synchronous code, said data frame-synchronous code including a code pattern substantially different from said modified code-converted synchronous code, thereby enabling said block-synchronous code and said frame-synchronous code to be distinguished.

13. A device as in claim 12 wherein said code-converting uses a run length coding scheme.

14. A device as in claim 13, wherein said run length coding scheme is a 2-7 coding scheme and said partly modifying is such that eight zeros in a row are formed.

15. A device as in claim 13 further comprising means for 2-7 decoding said block synchronous code data.

* * * * *